(12) United States Patent
Schaverien et al.

(10) Patent No.: US 10,308,877 B2
(45) Date of Patent: Jun. 4, 2019

(54) PROCESS FOR PRODUCTION OF AROMATICS VIA PYROLYSIS OF LIGNIN-COMPRISING MATERIAL

(71) Applicant: SHELL OIL COMPANY, Houston, TX (US)

(72) Inventors: Colin John Schaverien, Amsterdam (NL); Yunming Fang, Beijing (CN)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/540,401

(22) PCT Filed: Dec. 24, 2015

(86) PCT No.: PCT/EP2015/081236
§ 371 (c)(1),
(2) Date: Jun. 28, 2017

(87) PCT Pub. No.: WO2016/107823
PCT Pub. Date: Jul. 7, 2016

(65) Prior Publication Data
US 2017/0369787 A1 Dec. 28, 2017

(30) Foreign Application Priority Data

Dec. 29, 2014 (WO) ................ PCT/CN2014/095349

(51) Int. Cl.
*C10G 9/32* (2006.01)
*C10B 53/02* (2006.01)
(Continued)

(52) U.S. Cl.
CPC ............. *C10G 1/02* (2013.01); *B01J 29/405* (2013.01); *C10B 49/10* (2013.01); *C10B 49/22* (2013.01);
(Continued)

(58) Field of Classification Search
CPC .............................. C10B 49/10; C10B 49/22
See application file for complete search history.

(56) References Cited

U.S. PATENT DOCUMENTS

2012/0117860 A1* 5/2012 Brady ...................... B01J 23/90
44/307
2013/0324772 A1 12/2013 Huber et al.
(Continued)

FOREIGN PATENT DOCUMENTS

CN 102701898 A 10/2012
WO 2009018531 A1 2/2009
(Continued)

OTHER PUBLICATIONS

International Search Report and Written Opinion received for PCT Patent Application No. PCT/EP2015/081236, dated on Apr. 4, 2016, 10 pages.
(Continued)

*Primary Examiner* — Philip Y Louie
*Assistant Examiner* — Alyssa L Cepluch (57) ABSTRACT

This invention relates to a process for the conversion of a feedstock comprising a lignin-comprising material, comprising the steps (a) to (c):
(a) charging the feedstock to a fluidized bed reactor;
(b) pyrolyzing at least part of the feedstock in the fluidized bed reactor while introducing a carrier gas into the reactor, to produce pyrolysis vapors;
(c) reacting at least part of the pyrolysis vapors coming from step (b) in a second reactor comprising a catalyst, to produce hydrocarbon products comprising aromatics.

10 Claims, 4 Drawing Sheets

(51) Int. Cl.

| | | |
|---|---|---|
| *C10G 1/02* | (2006.01) | |
| *C10B 49/10* | (2006.01) | |
| *C10G 3/00* | (2006.01) | |
| *B01J 29/40* | (2006.01) | |
| *C10K 3/02* | (2006.01) | |
| *C10B 49/22* | (2006.01) | |
| *C10B 57/06* | (2006.01) | |

(52) U.S. Cl.
CPC .............. *C10B 53/02* (2013.01); *C10B 57/06* (2013.01); *C10G 3/49* (2013.01); *C10G 9/32* (2013.01); *C10K 3/02* (2013.01); *C10G 2300/1014* (2013.01); *C10G 2300/202* (2013.01); *C10G 2400/30* (2013.01); *Y02E 50/14* (2013.01); *Y02P 30/20* (2015.11)

(56) References Cited

U.S. PATENT DOCUMENTS

| | | | | |
|---|---|---|---|---|
| 2013/0327626 | A1* | 12/2013 | Daugaard | C10G 1/02 201/2.5 |
| 2014/0069799 | A1* | 3/2014 | Gorke | C10G 2/32 202/105 |
| 2014/0206913 | A1 | 7/2014 | Mazanec et al. | |
| 2015/0225652 | A1* | 8/2015 | Lei | C10K 3/02 585/242 |
| 2016/0030931 | A1* | 2/2016 | Kelkar | C10G 3/49 585/240 |

FOREIGN PATENT DOCUMENTS

| | | |
|---|---|---|
| WO | 2011138357 A1 | 11/2011 |
| WO | 2013032672 A1 | 3/2013 |
| WO | 2013103872 A1 | 7/2013 |

OTHER PUBLICATIONS

Valle et al., "Selective Production of Aromatics by Crude Bio-oil Valorization with a Nickel-Modified HZSM-5 Zeolite Catalyst", Energy & Fuels, American Chemical Society, vol. 24, Issue No. 3, 2010, pp. 2060-2070, XP002661353.

Diebold et al., "Biomass to Gasoline", Pyrolysis Oils from Biomass, American Chemical Society, vol. 376, Chapter 23, 1988, pp. 264-276, XP055114410.

Wilson, "Fluid Catalytic Cracking Technology and Operations", Chapter 3, 1997, pp. 101-112.

Fang et al., "In Situ Assembly of Zeolite Nanocrystals into Mesoporous Aggregate with Single-Crystal-Like Morphology without Secondary Template", American Chemical Society, Chem. Mater., vol. 20, Issue No. 5, 2008, pp. 1670-1672.

He et al., "Catalytic Conversion of Biomass by Natural Gas for Oil Quality Upgrading", Industrial & Engineering Chemical Research, vol. 53, Issue No. 41, Sep. 22, 2014, pp. 1-40.

International Search Report and Written Opinion received for PCT Patent Application No. PCT/CN2014/095349, dated on Oct. 10, 2015, 11 pages.

\* cited by examiner

PROCESS FOR PRODUCTION OF AROMATICS VIA PYROLYSIS OF LIGNIN-COMPRISING MATERIAL

PRIORITY CLAIM

The present application is the National Stage (§ 371) of International Application No. PCT/EP2015/081236, filed Dec. 24, 2015, which claims priority from PCT/CN2014/095349, filed Dec. 29, 2014 incorporated herein by reference.

FIELD OF THE INVENTION

This invention relates to a process for the production of aromatics via pyrolysis of a feedstock comprising a lignin-comprising material.

BACKGROUND OF THE INVENTION

With the diminishing supply of fossil fuel resources, the use of sustainable and renewable biologically derived feeds is becoming increasingly important for the production of liquid fuels and/or chemicals. The use of such biologically derived feeds may also allow for a more sustainable production of liquid fuels and more sustainable $CO_2$ emissions that may help meet global $CO_2$ emissions standards under the Kyoto protocol. Processes for the conversion of biologically derived materials into fuels and/or chemicals are known in the art.

Catalytic fast pyrolysis is an interesting technology for the conversion of biologically derived materials since it combines the advantages of fast pyrolysis and high product quality. In such a process, solid biomass is first pyrolyzed into volatile organics, gases, and solid coke then the organics upgrade over a catalyst in-situ. Scientists both from academic and industry have done a lot of research in this area.

For example, WO2013/103872 describes a method for pyrolysis of biomass. A two-stage reactor/process is disclosed for conversion of solid particulate biomass material and includes a first stage in which solid particulate biomass material is pyrolyzed to primary reaction products, and a second stage in which the primary reaction products are catalytically converted, which second stage is operated at a temperature higher than that of the first stage. According to WO2013/103872 the wt % yield of liquid bio-oil is higher than the wt % yield produced in a process where the second stage is operated at equal or lower temperature than in the first stage. In the Examples of WO2013/103872 the catalyst used is a phosphorous and zeolite containing catalyst, such as described in ID243US-PRO. Further, it is not clear from WO2013/103872 how exactly the reaction in the Example is performed. In the Examples is not described what exactly the reactor looks like and how the process is carried out, and according to the description of WO2013/103872 a broad range of parameters may be varied in the process.

WO 2013/032672 describes methods for producing fluid hydrocarbon products via catalytic pyrolysis, wherein the reactants comprise solid hydrocarbonaceous materials and hydrogen or a source of hydrogen (e.g. in particular an alcohol). The products may include specific aromatic compounds (e.g. benzene, toluene, naphthalene, xylene, etc.).

Techno-economic analyses have shown that catalytic pyrolysis is a promising technology for biofuel production because of the simple process configuration and promising aromatics yield. An important challenge of this process however is the high cokes formation and the related short lifetime of catalyst. Thus, although several pyrolysis methods have been disclosed in the art, optimization of the conditions is still needed.

The present invention provides a pyrolysis method with a selected set of conditions that leads to an aromatic hydrocarbon product with a very low oxygen content. Also, it was found that coking can be reduced by using a specific carrier gas. Further, by using the conditions of this invention, the lifetime of the catalyst may be increased.

SUMMARY OF THE INVENTION

The present invention provides a process for the conversion of a feedstock comprising a lignin-comprising material, comprising the steps (a) to (c):
(a) charging the feedstock to a fluidized bed reactor;
(b) pyrolyzing at least part of the feedstock in the fluidized bed reactor while introducing a carrier gas into the reactor, to produce pyrolysis vapours;
(c) reacting at least part of the pyrolysis vapours coming from step (b) in a second reactor comprising a catalyst, to produce hydrocarbon products comprising aromatics;
in which process
in step (a) sand is used as a heat carrier in the fluidized bed; and
in step (b) a $C_1$-$C_4$ hydrocarbon, such as a $C_2$-$C_4$ olefin or $C_1$-$C_4$ alkane, and preferably a $C_1$-$C_4$ alkane, is introduced into the reactor as a carrier gas; and the temperature in the fluidized bed reactor in step (b) is equal to or more than 400° C. to equal to or less than 600° C. and the temperature in the reactor in step (b) is kept higher than in the reactor in step (c); and
the reactor in step (c) comprises a MFI or MWW type zeolite catalyst and the temperature in the reactor is equal to or more than 350° C. to equal to or less than 550° C.

Without wishing to be bound by any kind of theory it is believed that lignin has more carbon, less hydrogen, and less oxygen than for example cellulose or hemicellulose. Lignin therefore advantageously has higher energy content than for example cellulose or hemicellulose. In addition the reduced oxygen-content of lignin has advantages. Unfortunately, however, lignin may also be more difficult to breakdown than cellulose or hemi-cellulose.

The process according to the invention, however, advantageously allows one to convert lignin into aromatic products, in particular Benzene, Toluene and/or Xylene (herein also abbreviated as BTX) with good yields in an economically attractive manner.

DETAILED DESCRIPTION OF THE INVENTION

The process according to the invention uses a feedstock of a lignin-comprising material.

Such lignin may for example include polymers of p-coumaryl alcohol, coniferyl alcohol, sinapyl alcohol, methoxylated coumaryl alcohol, methoxylated coniferyl alcohol, methoxylated sinapyl alcohol and mixtures thereof.

In addition to the lignin, the lignin-comprising material can comprise other components, such as for example cellulose and/or hemicellulose.

In a preferred embodiment the lignin-comprising material is a lignocellulosic material. By a lignocellulosic material is herein understood a material containing at least lignin and cellulose (also sometimes referred to as lignocellulose). In addition, such a material may further contain hemicellulose. Examples of suitable lignocellulosic materials include agricultural wastes such as corn stover, soybean stover, corn cobs, rice straw, rice hulls, oat hulls, corn fibre, cereal straws such as wheat, barley, rye and oat straw; grasses; forestry products and/or forestry residues such as wood and wood-related materials such as sawdust; waste paper; sugar processing residues such as bagasse and beet pulp; or mixtures thereof; waste paper; sugar processing residues such as bagasse and beet pulp; or mixtures thereof. More preferably the lignocellulosic material is selected from the group consisting of wood and/or a wood-related material, sawdust, straw, grass, bagasse, corn stover and/or mixtures thereof.

Preferably the lignocellulosic material comprises equal to or more than 20 wt. %, more preferably equal to or more than 30 wt %, and most preferably equal to or more than 40 wt % lignin, based on the total weight of lignin-containing material. For practical purposes, the lignocellulosic material may contain equal to or less than 99 wt % lignin, based on the total weight of lignocellulosic material. For example, willow wood may contain about 25 wt % lignin, larch wood may contain about 35 wt % lignin, straw may contain about 14 wt % lignin, beech wood may contain about 12-23 wt % lignin and coniferous wood may contain about 25-35 wt % lignin.

In another preferred embodiment the lignin-comprising material is a material containing equal to or more than 50 wt %, preferably equal to or more than 75 wt %, more preferably equal to or more than 90 wt % lignin. Such lignin-comprising material may suitably contain equal to or less than 100 wt % lignin, based on the total weight of lignin-containing material. In an especially preferred embodiment the lignin-comprising material consists essentially of lignin (i.e. comprises essentially 100 wt % lignin based on the total weight of the material). Examples of a lignin-comprising material with such high lignin contents include for example so-called organosolv lignin or wood derived and possibly dried, lignin.

The lignin-comprising material may be preconditioned before use in the process of the invention. Such a preconditioning may include for example drying, torrefaction and/or size reduction of the lignin-containing material.

In a preferred embodiment the lignin-comprising material is dried before being subjected to the process of the invention. Drying can be carried out by any method known by the person skilled in the art to be suitable for drying of a lignin-comprising material. Preferably the lignin-containing material is dried at a temperature of 100° C. or more. More preferably the lignin-comprising material is dried at a temperature in the range from equal to or more than 100° C. to equal to or less than 200° C. In a preferred embodiment the lignin-comprising material is dried in a fired rotary drum drier. The lignin-comprising material after drying may suitably have a water-content of equal to or less than 20 wt %, more suitably of equal to or less than 15 wt % and most suitably of equal to or less than 10 wt %.

In an embodiment the lignin-comprising material is a torrefied lignin-comprising material. Without wishing to be bound by any kind of theory, it is believed that by means of torrefaction the lignin percentage by weight of the lignin-comprising material can be increased. In a preferred embodiment the process according to the invention therefore includes a step of torrefying the lignin-comprising material at a temperature of more than 200° C. to produce a torrefied lignin-comprising material. The torrefied lignin-comprising material can subsequently be contacted with the MFI type zeolite. Preferably such torrefied lignin-comprising material comprises equal to or more than 20 wt. %, more preferably equal to or more than 30 wt %, and most preferably equal to or more than 40 wt % lignin, based on the total weight of torrefied lignin-comprising material. For practical purposes, the torrefied lignin-comprising material may contain equal to or less than 100 wt % lignin, suitably equal to or less than 99 wt % lignin, possibly equal to or less than 80 wt % lignin or even equal to or less than 60 wt % lignin, based on the total weight of torrefied lignin-comprising material.

By torrefying or torrefaction is herein understood the treatment of the solid biomass material at a temperature in the range from equal to or more than 200° C. to equal to or less than 350° C. in the essential absence of a catalyst and in an oxygen-poor, preferably an oxygen-free, atmosphere. By an oxygen-poor atmosphere is understood an atmosphere containing equal to or less than vol. % oxygen, preferably equal to or less than 10 vol. % oxygen and more preferably equal to or less than 5 vol. % oxygen. By an oxygen-free atmosphere is understood that the torrefaction is carried out in the essential absence of oxygen.

Torrefying of the lignin-comprising material is preferably carried out at a temperature of more than 200° C., more preferably at a temperature equal to or more than 210° C., still more preferably at a temperature equal to or more than 220° C., yet more preferably at a temperature equal to or more than 230° C. In addition torrefying of the lignin-comprising material is preferably carried out at a temperature less than 350° C., more preferably at a temperature equal to or less than 330° C., still more preferably at a temperature equal to or less than 310° C., yet more preferably at a temperature equal to or less than 300° C.

Torrefaction of the solid biomass material is preferably carried out in the essential absence of oxygen. More preferably the torrefaction is carried under an inert atmosphere, containing for example inert gases such as nitrogen, carbon dioxide and/or steam; and/or under a reducing atmosphere in the presence of a reducing gas such as hydrogen, gaseous hydrocarbons such as methane and ethane or carbon monoxide.

The torrefying step may be carried out at a wide range of pressures. Preferably, however, the torrefying step is carried out at atmospheric pressure (about 1 bar absolute, corresponding to about 0.1 MegaPascal).

The lignin-comprising material is preferably a solid material. Before being used in the process of the invention, the material is preferably comminuted into small pieces in order to facilitate mixing the material with the heat carrier in the pyrolysis reactor. Conveniently, the lignin-comprising material can be comminuted into chips of average length of 0.5 to 30 mm.

The lignin-comprising material is introduced into the reactor by any suitable type of feeding system known in the art, e.g. a spring screw feeder.

In the process according to the invention, the lignin-comprising feedstock is pyrolyzed in a fluidized bed reactor at a temperature of equal to or more than 400° C., preferably equal to or more than 500° C. to equal to or less than 600° C. In particular, the temperature at which the feedstock is pyrolyzed ranges from equal to or more than 525° C., more preferably from equal to or more than 540° C., to equal to or less than 575° C., more preferably to equal to or less than 560° C. A preferred temperature in the fluidized bed reactor is 550° C.

The pressure at which the feedstock is pyrolyzed may vary widely. Preferably this pressure lies in the range from equal to or more than 0.5 bar absolute to equal to or less than 10 bar absolute (0.05 MegaPascal-1 MegaPascal), more preferably from equal to or more than 1.0 bar absolute to equal to or less than 3 bar absolute (0.1 MegaPascal to 0.3 MegaPascal), and particularly atmospheric pressure (i.e. about 1.0 bar absolute).

The weight ratio of the heat carrier (sand) to lignin-comprising material at the location where the material is supplied to the fluidized bed reactor for pyrolysis preferably lies in the range from equal to or more than 1:1, more preferably from equal to or more than 2:1 and most preferably from equal to or more than 3:1 to equal to or less than 15:1, more preferably to equal to or less than 10:1, most preferably to equal to or less than 5:1.

The $C_1$-$C_4$ hydrocarbon carrier gas is introduced into the reactor in an amount from equal to or more than 5 wt % to equal to or less than 50%, preferably from equal to or more than 10 wt % to equal to or less than 40%, more preferably from equal to or more than 15 wt % to equal to or less than 35%, most preferably to equal to or less than 30%, and in particular to equal to or less than 25% of the total of the lignin-comprising material.

The $C_1$-$C_4$ hydrocarbon carrier gas is preferably an alkane carrier gas, being selected from methane, ethane, propane, n-butane and t-butane, and mixtures thereof. Preferred are $C_3$-$C_4$ alkane gases. Most preferred is butane gas.

Preferably, in addition to the $C_1$-$C_4$ hydrocarbon carrier gas also nitrogen is introduced into the reactor as carrier gas for dilution purposes, to better regulate the thermodynamics of the reaction.

The reactor for the pyrolysis reaction is a fluidized bed reactor. In an embodiment of the invention the sand that is used as a heat carrier in the fluidized bed reactor may be circulated and recycled into the fluidized bed reactor for re-use.

By a riser reactor is herein preferably understood an elongated, preferably essentially tube-shaped, reactor. The elongated reactor is preferably oriented in an essentially vertical manner.

Examples of suitable riser reactors are described in the Handbook titled "Fluid Catalytic Cracking technology and operations", by Joseph W. Wilson, published by PennWell Publishing Company (1997), chapter 3, especially pages 101 to 112, herein incorporated by reference. For example, the riser reactor may be a so-called internal riser reactor or a so-called external riser reactor as described therein.

The riser reactor may comprise a bottom section fluidly connected to a downstream riser reactor pipe wherein the bottom section has a diameter which is larger than the maximum diameter of the riser reactor pipe. Further the riser reactor pipe may have a diameter that increases in a downstream direction.

After the lignin-comprising material is pyrolyzed in a fluidized bed reactor in step (b), the pyrolysis vapours are conducted for step (c), for upgrading, to a second reactor comprising a catalyst, which may be a fixed bed reactor or a fluidized bed reactor. Preferably the second reactor is a fixed bed reactor. Optionally, the pyrolysis vapours are first led through a cyclone and optionally a filter for removing solid particles.

In step (c) of the process of the invention, the pyrolysis vapours are contacted with a MFI or MWW type zeolite catalyst. The catalysts preferably have a pore size ranging from 0.5 to 0.6 nm and have a strong acidity. A preferred MWW type zeolite is MCM-22. By a MFI type zeolite is herein understood a zeolite having the characteristics of the MFI type as listed in the database approved by the Structure Commission of the International Zeolite Association (IZA-SC)that can be found at http://www.iza-structure.org/databases. More preferably, the MFI type zeolite is a zeolite belonging to the so-called pentasil family of zeolites. A highly preferred zeolite is ZSM-5, which has a pore structure that selectively creates mono-aromatics. A further preferred catalyst comprises ZSM-5 nanosheet material, which—similar to MFI nanosheets—has a multilamellar structure.

In a further embodiment of the invention, the MFI type zeolite catalyst is a mesoporous catalyst. Preferably, a mesoporous ZSM-5 zeolite or a mesoporous Ga/ZSM-5 zeolite is used. The use of a mesoporous ZSM-5 catalyst, for example allows to tune the selectivity between the aromatics, by decreasing benzene and toluene yield, and increasing the C8-C10 mono-aromatics. In the article titled "In situ assembly of zeolite nanocrystals into mesoporous aggregate with single-crystal like morphology without secondary template" by Yunming Fang et al. published in Chem. Mater. Vol. 20, pages 1670-1672 (2008) the synthesis of a so-called mesoporous ZSM-5 zeolite is described. A uniform mesoporous aggregate of zeolite nanocrystals with size smaller than 1 micrometer was formed. This is an example of a preferred mesoporous ZSM-5 catalyst.

The volume of mesopores (also called mesopore volume, cm/gram) in the MFI-type zeolite may vary widely. Preferably, however, the mesoporous volume lies in the range from equal to or more than 0.10 $cm^3$/gram, more preferably from equal to or more than 0.20 $cm^3$/gram, and most preferably from equal to or more than 0.30 $cm^3$/gram to equal to or less than 1.50 $cm^3$/gram, more preferably from equal to or less than 1.25 $cm^3$/gram, most preferably equal to or less than 1.00 $cm^3$/gram.

The pore volumes of the zeolite catalyst can suitably be determined by nitrogen adsorption analysis according to ASTM standard ASTM D5604.

In addition to the MFI-type zeolite, the catalyst may contain one or more additional zeolites. Such additional zeolite is preferably chosen from the group consisting of Y zeolites; ultrastable Y zeolites (USY); X zeolites, zeolite beta, zeolite L, offretite, mordenite, faujasite (including synthetic faujasite), zeolite omega, Rare Earth zeolite Y (=REY) and Rare Earth USY (REUSY). Further the catalyst may contain additional zeolites for example chosen from the group consisting of MTW type zeolites (such as for example ZSM-12); MTT type zeolites (such as for example ZSM-23;)the TON type zeolites (such as for example zeolite theta one or ZSM-22); and the FER structural type, for example, ferrierite.

The MFI-type zeolite and optionally additional further zeolites are preferably dispersed in an amorphous matrix component. For example the catalyst may contain amorphous silica alumina, the MFI-type zeolite and optionally one or more additional zeolites. In addition, the catalyst preferably contains a binder and/or a filler.

Examples of such an amorphous matrix include amorphous silica-alumina, amorphous silica, amorphous alumina, amorphous titania, amorphous zirconia and amorphous magnesium oxide, or combinations of two or more of these.

The MFI-type zeolite is preferably used in the form of extrudates, suitably with alumina, preferably with 35-45%, in particular 40%, of alumina. Preferably the MFI-type zeolite comprises a ratio of moles Silica to moles Alumina ($SiO_2$:$Al_2O_3$) in the range from equal to or more than 20 to 1 (20:1) to equal to or less than 100 to 1 (100:1), more preferably in the range from equal to or more than 30 to 1 (30:1) to equal to or less than 80 to 1 (80:1).

For ZSM-5 a Si/Al ratio from equal to or more than 30 to 1 (30:1) to equal to or less than 40 to 1 (40:1) seems to be optimal and is therefore a preferred ratio. When it becomes less, the zeolite structure becomes less stable, while when it becomes too high, the reactivity drops, and especially the selectivity for aromatics.

An example of a binder is silica sol. Examples of fillers include natural or synthetic clays, pillared or delaminated clays, or mixtures of one or more of these. Examples of clays which may be present in the catalyst include kaolin, hectorite, sepiolite and attapulgite.

The total amount of zeolite that is present in the catalyst is preferably in the range of 5 wt % to 50 wt %, more preferably in the range of 10 wt % to 30 wt %, and even more preferably in the range of 10 wt % to 25 wt % relative to the total mass of the catalyst, whilst the remainder is preferably amorphous matrix component, binder and/or filler.

In addition the catalysts may contain a metal and/or metal oxide. For example the catalyst may contain nickel, platinum, vanadium, palladium, manganese, cobalt, zinc, copper, chromium, zinc, gallium and/or any of their oxides. Preferably the catalyst contains nickel, gallium or zinc or any combination or oxide thereof, and in particular gallium. A highly preferred catalyst is a Ga/ZSM-5 catalyst, preferably produced impregnating a spray dried ZSM-5 catalyst with Ga.

The WHSV (weight hourly space velocity) of the step (c) lies in the range from equal to or less than 10 $hr^{-1}$, more preferably from equal to or less than 1 $hr^{-1}$ and most preferably from equal to 0.1 $hr^{-1}$.

The pressure in the second reactor lies in the range from equal to or more than 0.5 bar absolute to equal to or less than 10 bar absolute (0.05 MegaPascal 1 MegaPascal), more preferably from equal to or more than 1.0 bar absolute to equal to or less than 3 bar absolute (0.1 MegaPascal to 0.3 MegaPascal), and particularly is atmospheric pressure (i.e. about 1.0 bar absolute).

The temperature in the second reactor is from equal to or more than 350° C. to equal to or less than 550° C., preferably from 400° C., more preferably from 450° C. to equal to or less than 525° C. In a preferred embodiment the temperature in the second reactor is 500° C.

The total reaction time of steps (b) and (c) is preferably from equal to or more than 1 hr to equal to or less than 15 hrs, preferably from equal to or more than 2 hr to equal to or less than 10 hrs, more preferably from equal to or more than 3 hr, to equal to or less than 6 hrs, and in particular less than 5 hrs. In the case that such reaction times are observed, the oxygen content in the product may be 5% or lower, and preferably 3% or lower, in particular 2% or lower, and especially 1% or lower.

The process of the invention for the conversion of a feedstock comprising a lignin-comprising material may advantageously produce aromatic product, preferably containing Benzene, Toluene and/or Xylene (herein also abbreviated to BTX).

If so desired, the product may be separated from any solid residues present in the effluent of the process. In addition, if so desired, the product may be fractionated to increase BTX content. Preferably, however, a product containing a desired BTX content is obtained directly from the process according to the invention, without the need of fractionation.

As indicated above, in the process according to the invention one or more products may be produced. In an embodiment of the invention this/these one or more products is/are subsequently fractionated to produce one or more product fractions.

In a further embodiment at least one of the one or more product fractions obtained by fractionation may be subsequently hydrotreated to produce a hydrotreated product fraction. This/these hydrotreated product fraction(s) may be used as fuel and/or chemical component(s) in respectively a fuel and/or chemical.

Figure 1:
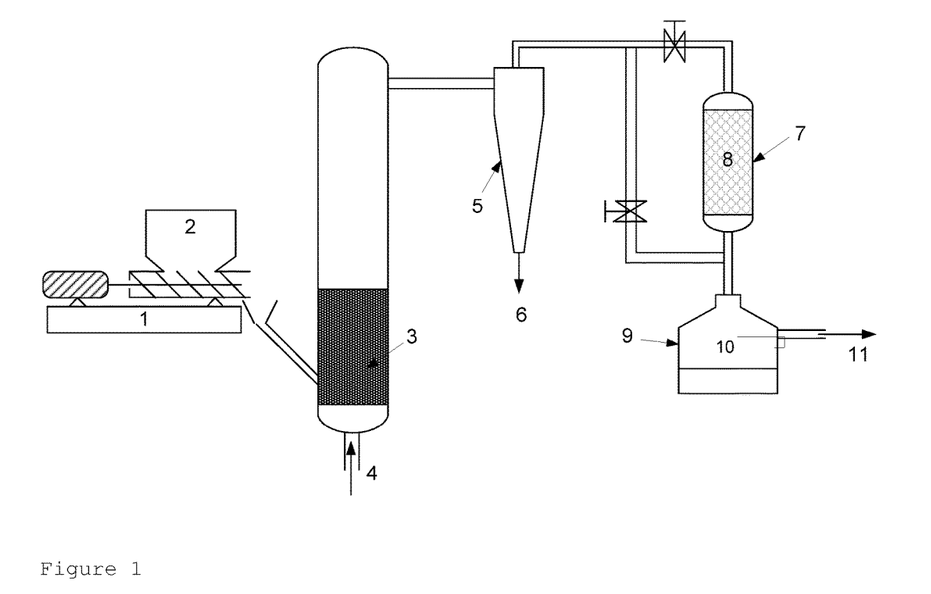
FIG. 1 schematically shows a unit for performing the process of this invention, comprising a fluidized bed reactor and a fixed bed reactor.

DETAILED DESCRIPTION FIG. 1

FIG. 1 shows a fluidized-bed reactor with an attached fixed bed for the in-situ bio-oil upgrading. The lignin-comprising material (2) is weighed on a balance (1) and is introduced into a fluidized bed reactor (3), which is provided with an inlet for carrier gas (4), via an outlet from the fluidized bed reactor, the pyrolysis vapours and gases are passed through a cyclone (5), where char and ash are separated and leave via outlet (6). Then the pyrolysis vapours are conducted to a fixed bed reactor (7) with a catalyst bed (8). The products from fixed bed are introduced into a condenser (9)to recover liquid products(10). Gases exit the condenser through exit (11).

The invention is further illustrated by the following non-limiting examples.

EXAMPLES

Materials

Biomass: The biomass feedstock that was used was in the form of wood chips. The wood chips were dried, ground and sieved into the desired particles size (<40 mesh) before the pyrolysis experiment.

Catalyst: ZSM-5, Ga/ZSM-5, mesoporous ZSM-5 and ZSM-5 nanosheet were synthesized in-house. The Si/Al ratio was kept the same (Si/Al=40) for ZSM-5, Ga/ZSM-5 and ZSM-5 nanosheet. In Ga/ZSM-5, framework (FW) Si/Ga and Si/Al ratios were 50 and 40, respectively. The non-framework Ga was 0.32 mmol/g. Mesoporous ZSM-5 was synthesized by desilication of ZSM-5 in NaOH solution. The mesopore volume of mesoporous ZSM-5 and ZSM-5 nanosheet was determined by nitrogen adsorption analysis. Typically the mesopore volume was 0.34 ml/g and the micropore volume 0.14 ml/g, with a total surface area of 315 $m^2$/g. The ZSM-5 nanosheet also show characters of mesoporosity. The mesopore volume of ZSM-5 nanosheet was 0.37 ml/g and the micropore volume 0.12 ml/g, with a total surface area of 347 $m^2$/g. Zeolites were shaped into extrudes for application in the fixed bed upgrading reactor. For this 40 wt % alumina was used as binder material.

Experimental Procedure

The pyrolysis experiments were conducted in a bubbling fluidized-bed (BFB) reactor unit with an attached fixed bed for the vapour upgrading, as shown in FIG. 1. The fluidized bed reactor had an inner diameter of 25 mm, and a length of 600 mm, which included a gas preheating zone below a 100 mm porous gas distribution plate. Both fluidized bed and fixed bed reactors were externally heated with a three-zone electric furnace. Nitrogen and light hydrocarbons were used as the fluidization gas. When applied, the light hydrocarbon gas was 20 wt % of the total biomass feeding. For this, the mass flow controller was carefully calibrated for methane, propane and butane. Biomass was loaded into a feed hopper, from where it was fed into the BFB reactor using a special designed spring screw feeder system. The feed rate of the biomass was approximately 200 g/h on a dry basis. High velocity nitrogen swept the biomass particles through a sloped feeder tube into the reactor where they were back-mixed with the heat carrier (sand). Depending on the experiment, the typical temperature of the fluidized bed was 550° C. Temperatures of the catalyst bed and the reactor were measured and controlled with three K-type thermocouples.

Upon exiting the BFB reactor, the pyrolysis vapours and gases were passed through a cyclone and a ceramic hot gas filter, which were both maintained at a temperature of 400° C. The purpose of the hot gas filter was to separate char, ash, and entrained catalyst particles from the product vapours and gases. Then the primary pyrolysis vapours were passed to the attached fixed bed reactor. About 100 g ZSM-5 catalyst was loaded into the fixed bed. The temperature of the fixed bed was 500° C.

The products from the fixed bed were introduced into the liquid recovery system which consisted of two condensers. The condensers were cooled using a 50/50 mixture of ethylene glycol and water. The mixture itself was cooled down using a 20 L refrigerated circulating bath. The gas flow passed through a flow totalizer, which was followed by a GC for gas composition analysis. The GC system was specially designed for refinery gas analysis. The yields of liquid products and char/coke were determined gravimetrically by weighing.

The conversion of light hydrocarbon was calculated by light hydrocarbon balance in the inlet of fluidized bed and outlet of the reaction system. During calculation of the product yield, it was assumed that all the converted light carbon was converted into liquid hydrocarbon, this assumption would result in an over-correction in hydrocarbon yield from biomass, which is a conservative approach. In reality the hydrocarbon yield could thus be higher than the reported numbers, while it cannot be lower.

Characterization Methods

Liquid products were analyzed for their water content using volumetric Karl Fisher titration. The elemental composition (CHNS) of the bio-oil was determined using a Vario EL organic elemental analyzer.

The gas composition was analyzed with a GC station for refinery gas analysis. The GC was configured to run three parallel channels (one FID and two TCD). All three detectors collected data at the same time. 7 minutes were needed for the gas analysis.

The chemical composition of the liquid product was analyzed by GC-MS, with a ThermoFisher ISQ GC/MS station. A 1.0 mL/min constant flow program was used for the GC capillary column (Agilent J&W DB-5 MS capillary column (30 m×0.25 mm i.d.×0.32 µm)). The GC oven was programmed with the following temperature regime: hold at 50° C. for 1 min, ramp to 300° C. at 5° C. $min^{-1}$, hold at 300° C. for 1 min. The mass spectrometer was configured for electron impact ionization at 70 eV, with an interface temperature of 250° C. Electron impact mass spectra were obtained at the mass range from m/z 45 to 400. Proposed assignments of the main peaks were made from mass spectral detection (NIST05 MS library) and the retention time of the standard compounds. Prior to analysis, the spectrometer was mass-calibrated and abundance-tuned using heptacosafluorotributylamine. For the quantitative analysis of the catalytic pyrolysis products, the GC column was calibrated with several internal standards. The list of the standard compounds was as follows: phenol, guaiacol, syringol, catechol, eugenol, vanillin, 2-methoxy-4-methylphenol, 3-methyl-catechol, 1,2,3-trimethoxybenzene, 2-methoxy-4-vinyl-phenol, syringaldehyde, benzene, toluene, xylene, ethyl-benzene, naphthalene, methylnaphthalene, dimethyl-naphthalene. A concentrated stock solution was prepared by weighing 1 g of each individual calibration compound and dissolving them in a 50 mL volumetric flask using GC-grade ethanol. Aliquots of the 20 000 µg/mL stock solution were then diluted to concentrations of 500, 750, 1000, 1250, 2000, and 3000 µg/mL in ethanol. 1 µL of each diluted calibration standard solution was injected into the GC column for analysis. The peak area of each standard compound was then plotted against the mass of the compound in the 1 µL solutions and then linearly regressed to obtain the calibration curve for that compound by setting the intercept at the y axis as zero. The linearity of the curves was high (the $R^2$ values were above 0.99). The gradients of the calibration curves (response factor, peak area/sample amount) were found to be relative to the functional groups of the compounds. Therefore, the response factors for the compounds that were not calibrated were calculated on the basis of the group contribution method.

Effect of Light Hydrocarbons in the Fluidization Gas

Table 1 shows the product distribution of biomass catalytic pyrolysis with normal ZSM-5, using light hydrocarbons in the fluidization gas (20 wt % on biomass intake). The addition of a light hydrocarbon dramatically improves the yield of hydrocarbons (which are mainly aromatics). Propane and butane perform better than methane. As was mentioned in the materials and methods section, the conversion of light hydrocarbons was subtracted from the produced hydrocarbons, so the numbers reported in the table are conservative estimates. In practice they could be a little higher. The char number reported in the table is combined char formation in the pyrolysis and the upgrading reactor. In practice the ratio between the two was about 3:1, so 21-25% (on biomass intake) was produced in the pyrolysis reactor, and 7-9 wt % (on biomass intake) was produced in the upgrading reactor. Adding the light hydrocarbons helped to slightly reduce the coke formation in the upgrading reactor, from 9 to 7 wt-%.

TABLE 1

Product distribution using light hydrocarbons in the fluidization gas (20 wt % on biomass).

| | Product | | | | | | | | Light |
|---|---|---|---|---|---|---|---|---|---|
| | Organic | | | Gas | | | | | H.C. |
| | | | | | | Other | | | |
| Fluidization gas/T | H.C. (%) | Oxygenates (%) | $H_2O$ (%) | CO (%) | $CO_2$ (%) | Gas (%) | Char (%) | Total (%) | conversion (%) |
| $N_2$/400° C. | 7.8 | 12.5 | 16.3 | 10.4 | 4.8 | 5.9 | 33.0 | 91 | — |
| $N_2$ - methane/400° C. | 8.4 | 11.7 | 16.8 | 11.4 | 5.2 | 6.0 | 31.5 | 91 | 3 |
| $N_2$ - propane/400° C. | 12.0 | 5.4 | 17.0 | 11.6 | 5.8 | 5.4 | 30.3 | 88 | 10 |
| $N_2$ - butane/400° C. | 15.8 | 1.3 | 17.3 | 12.0 | 5.2 | 5.4 | 29.4 | 87 | 14 |
| $N_2$/500° C. | 6.4 | 13.0 | 16.5 | 9.8 | 4.4 | 6.1 | 34.0 | 90 | — |
| $N_2$ - methane/500° C. | 13.3 | 4.2 | 16.1 | 12.0 | 5.1 | 6.3 | 30.0 | 87 | 7 |
| $N_2$ - propane/500° C. | 16.2 | 0.2 | 17.4 | 12.2 | 5.4 | 5.8 | 29.0 | 86 | 17 |
| $N_2$ - butane/500° C. | 16.5 | 0 | 17.5 | 12.4 | 5.5 | 5.6 | 28.4 | 86 | 28 |

Temperature in fluidized bed: 550° C. Temperature in fixed bed is T in table.
ZSM-5 catalyst in fixed bed. Reaction time: 2 h.
H.C. stands for liquid hydrocarbon fraction.

Effect of Ga Incorporation in the ZSM-5

Table 2 shows the effect of incorporating gallium in the catalyst matrix. Again there is a clear positive effect on the hydrocarbon yield, while the yield of oxygenates was reduced. There was a very small effect on the char yield in the second reactor (0.5 wt %), which is probably within the experimental error.

TABLE 2

Product distribution using ZSM-5 with and without gallium.

| | Product | | | | | | | | Methane |
|---|---|---|---|---|---|---|---|---|---|
| | Organic | | | Gas | | | | | |
| | | | | | | Other | | | |
| Catalyst | Hydro-carbons (%) | Oxygenates (%) | $H_2O$ (%) | CO (%) | $CO_2$ (%) | Gas (%) | Char (%) | Total (%) | conversion (%) |
| Ga/ZSM-5 | 18.4 | 0 | 16.8 | 12.3 | 5.3 | 5.6 | 28.3 | 87 | 28 |
| ZSM-5 | 13.3 | 4.2 | 16.1 | 12.0 | 5.1 | 6.3 | 30.0 | 87 | 7 |

Temperature in fluidized bed: 550° C., Temperature in fixed bed: 500° C.
ZSM-5 catalyst in fixed bed. Reaction time: 2 h. Methane added to the fluidization gas (20 wt % on biomass).

Effect of Catalyst Mesoporosity

Table 3 shows the effect of using a mesoporous ZSM-5 instead of a normal one. There is a profound effect on the hydrocarbon yield, namely that it shoots up from 7.8 to 18 wt % on biomass intake, while the yield of oxygenates goes to zero. Coke yield did increase significantly in this case, and decreased again upon addition of propane to the fluidization gas.

TABLE 3

Product distribution using normal and mesoporous ZSM-5, with and without propane.

| | Product | | | | | | | | Light |
|---|---|---|---|---|---|---|---|---|---|
| | Organic | | | Gas | | | | | H.C. |
| | | | | | | Other | | | |
| Fluidization gas/cat | H.C. (%) | Oxygenates (%) | $H_2O$ (%) | CO (%) | $CO_2$ (%) | Gas (%) | Char (%) | Total (%) | conversion (%) |
| $N_2$/ZSM-5 | 7.8 | 12.5 | 16.3 | 10.4 | 4.8 | 5.9 | 33.0 | 91 | — |
| $N_2$/meso-ZSM-5 | 18.0 | 0 | 16.0 | 7.3 | 5.4 | 6.0 | 37.0 | 89 | — |
| $N_2$ - propane/meso-ZSM-5 | 17.5 | 0 | 17.0 | 10.2 | 6.3 | 7.4 | 27.6 | 86 | 28 |
| $N_2$/ZSM-5 nanosheet | 19.2 | 0 | 16.2 | 11.0 | 5.1 | 5.9 | 36.0 | 93 | — |

TABLE 3-continued

Product distribution using normal and mesoporous
ZSM-5, with and without propane.

| | Product | | | | | | | | |
|---|---|---|---|---|---|---|---|---|---|
| | Organic | | Gas | | | | | | Light H.C. |
| Fluidization gas/cat | H.C. (%) | Oxygenates (%) | $H_2O$ (%) | CO (%) | $CO_2$ (%) | Other Gas (%) | Char (%) | Total (%) | conversion (%) |
| $N_2$-propane/ZSM-5 nanosheet | 17.1 | 0 | 17.2 | 11.5 | 5.2 | 6.5 | 26.5 | 84 | 25 |

Temperature in fluidized bed: 550° C., Temperature in fixed bed: 400° C.
ZSM-5 catalyst in fixed bed. Reaction time: 2 h. 20 wt % Propane on biomass when added to the fluidization gas.
H.C. stands for liquid hydrocarbon fraction.

Figure 2:
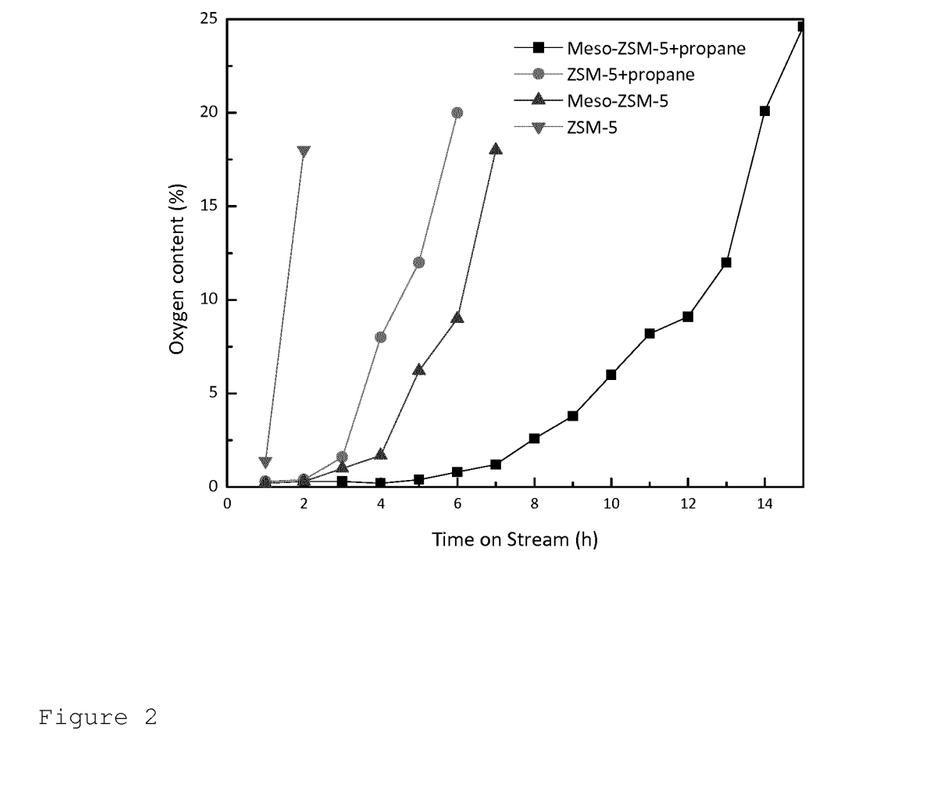
FIG. 2 shows the deactivation of zeolite catalysts in different conditions expressed by oxygen content of the pyrolysis-oil.

The deactivation of zeolite catalyst in different conditions expressed by oxygen content of the pyrolysis-oil is shown in FIG. 2. It can be seen that the mesoporous ZSM-5 have much longer lifetime when compared to the normal ZSM-5. And the introduction of light hydrocarbon can improve the catalyst lifetime.

Table 4 shows the molecular distribution of the hydrocarbon fraction from the experiment with mesoporous ZSM-5 and propane present in the fluidization gas (bottom row of Table 3), both after one hour and after five hours of reaction time. This experiment could run for seven hours before the catalyst was deactivated to a state where the oxygenates yield increased to above 1.5%. These data indicate that the amount of BTX+C9 in the hydrocarbon fraction adds up to about 80 wt %, but that the amount of naphthalenes is still significant and needs to be decreased further to allow direct blending into gasoline. The current specification for naphthalene is 2 vol %, and for C11 and higher naphthalenes that is less. Benzene levels also need to decrease to allow direct blending. The benzene specification on gasoline is typically below 1.0 vol %. The current benzene and naphthalene levels would allow direct blending of the this liquid product up to about 5 vol %. Preferably this should increase.

Table 4. Product distribution of the hydrocarbon fraction obtained from the experiment described in the bottom row of

TABLE 3

| | Product | | | | | |
|---|---|---|---|---|---|---|
| Time on stream | Benzene (wt %) | Toluene (wt %) | Arom. C8 (wt %) | Arom. C9 (wt %) | Naphthalenes (wt %) | Others (wt %) |
| 1 h | 18 | 28 | 26 | 8 | 17 | 3 |
| 5 h | 15 | 24 | 21 | 12 | 20 | 8 |

Figure 3:
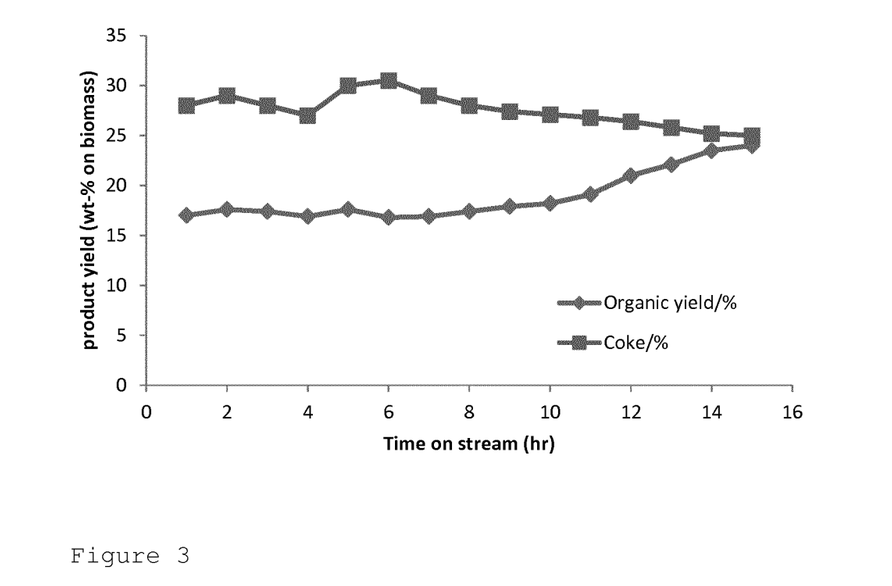
FIG. 3 shows the yields of organic liquid product and coke as a function of time on stream.
Figure 4:
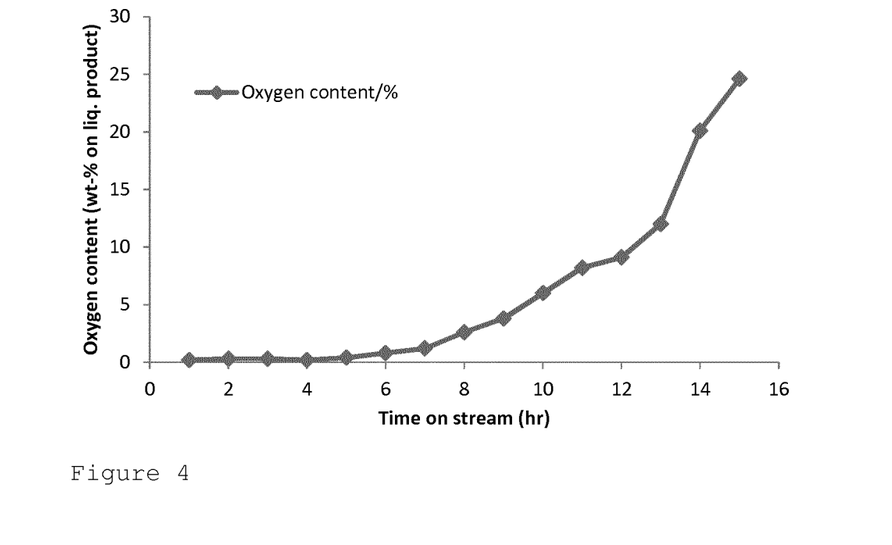
FIG. 4 shows the oxygen content of the organic liquid product as a function of time on stream.
Figure 5:
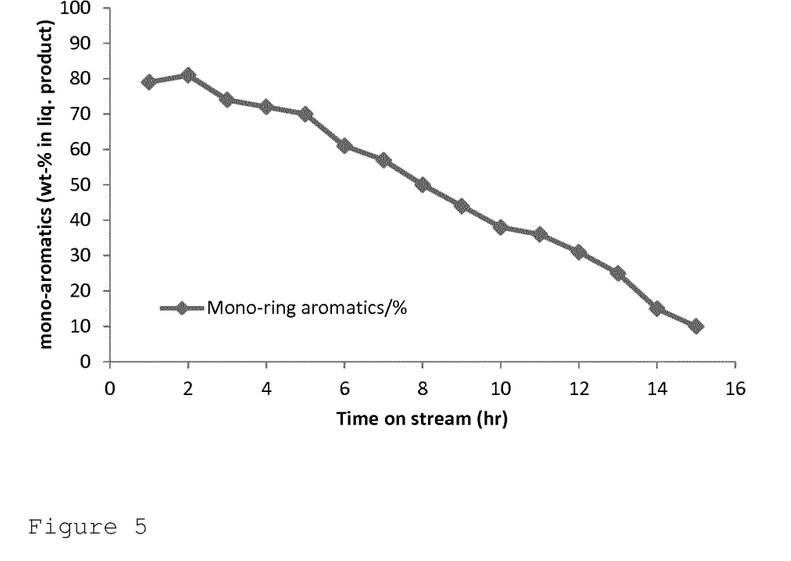
FIG. 5 shows the mono-aromatics content in the organic liquid product as a function of time on stream.
Figure 6:
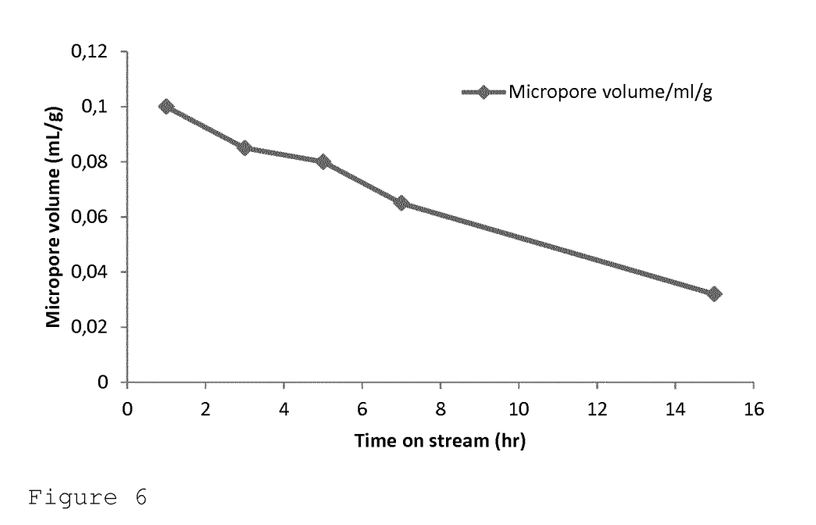
FIG. 6 shows the micropore volume of the zeolite as a function of time on stream.

The impact of catalyst deactivation on the product yields and quality was studied in further detail for the mesoporous catalyst. This was done by taking product samples every hour over a 15 hour period of time on stream, and running a few experiments over different times (1-2-5-7-15 hr), after which the catalyst was studied in further detail. FIG. 3 shows the yields of organic product (hydrocarbons plus oxygenates) and coke, while FIG. 4 shows the oxygen content of the organic product and FIG. 5 shows the percentage of monoaromatics in the organic product. These three figures paint a clear picture of the catalyst deactivation. For the first seven hours the amount of oxygen in the organic product was less than 1 wt %, after which is started to increase exponentially. At the same time the formation of mono-ring aromatics (BTX+C9) decreased steadily throughout the run. This indicated that after seven hours the catalytic sited started to get blocked, probably by coke formation on the catalyst. In order to assess to which extend the catalyst got blocked with coke, the micropore volume of the catalyst was determined after experiments of different times. Results are shown in FIG. 6 clearly a linear decrease of micropore volume took place over the first 15 hours, after which the catalyst had been almost completely deactivated.

Testing of Commercial ZSM-5

The previous experiments were all performed with a ZSM-5 catalyst that was synthesized in-house. In order to test if the data are relevant for a commercially produced zeolite, some of the experiments were repeated with two ZSM-5 catalysts that were purchased from zeolite, namely 'ZSM-5 5524E' and 'ZSM-5 3024E'. Table 5 shows the results of these experiments, which clearly indicate that the data obtained with synthesized ZSM-5 can be reproduced with a commercial zeolite. '3024E' produced 17 wt % hydrocarbons on biomass and no oxygenates, in the presence of propane in the fluidization gas.

TABLE 5

Performance of commercial ZSM-5 catalysts
compared to the synthesized ZSM-5.

| | | Product | | | | |
|---|---|---|---|---|---|---|
| Catalyst | Fluidiz. gas | Hydrocarbons (wt %) | Oxygenates (wt %) | Coke on sand (wt %) | Coke in fixed bed (wt %) | Total (wt %) |
| Synthesized ZSM-5 | $N_2$ | 6.4 | 13.0 | 25.2 | 8.8 | 90 |

TABLE 5-continued

Performance of commercial ZSM-5 catalysts compared to the synthesized ZSM-5.

| Catalyst | Fluidiz. gas | Product | | | | |
|---|---|---|---|---|---|---|
| | | Hydro-carbons (wt %) | Oxygenates (wt %) | Coke on sand (wt %) | Coke in fixed bed (wt %) | Total (wt %) |
| Synthesized ZSM-5 | N$_2$ + propane | 16.2 | 0.2 | 21.8 | 7.3 | 86 |
| ZSM-5 5524E | N$_2$ | 6.8 | 13.2 | 21.5 | 7.5 | 90 |
| ZSM-5 5524E | N$_2$ + propane | 15.8 | 0.4 | 22.0 | 7.0 | 89 |
| ZSM-5 3024E | N$_2$ | 7.2 | 12.6 | 21.9 | 8.1 | 91 |
| ZSM-5 3024E | N$_2$ + propane | 17.1 | 0 | 20.8 | 7.2 | 88 |

Temperature in fluidized bed: 550° C., Temperature in fixed bed: 500° C.
ZSM-5 catalyst in fixed bed. Reaction time: 2 h. 20 wt % Propane on biomass when added to the fluidization gas.

That which is claimed is:

1. A process for the conversion of a feedstock comprising a lignin-comprising material, the process comprising:
    (a) charging the feedstock to a fluidized bed reactor comprising a heat carrier, wherein the heat carrier comprises sand;
    (b) pyrolyzing at least part of the feedstock in the fluidized bed reactor to produce pyrolysis vapours while introducing a carrier gas into the reactor,
    wherein the carrier gas comprises nitrogen and at least one of a C3 alkane and a C4 alkane; and
    (c) reacting at least part of the pyrolysis vapours coming from step (b) in a second reactor comprising a catalyst, to produce hydrocarbon products comprising aromatics, wherein the second reactor is a fixed bed reactor comprising a MFI or MWW zeolite catalyst;
    wherein the temperature in the fluidized bed reactor in step (b) is equal to or more than 400° C. to equal to or less than 600° C., the temperature in the reactor in step (c) is equal to or more than 350° C. to equal to or less than 550° C., and the temperature in the reactor in step (b) is kept higher than in the reactor in step (c).

2. The process of claim 1, wherein the carrier gas in step (b) comprises butane gas.

3. The process of claim 1, wherein the temperature in the reactor in step (b) is kept at about 550° C. and in step (c) the temperature in the reactor is kept at about 500° C.

4. The process of claim 1, wherein the total reaction time of steps (b) and (c) is from equal to or more than 1 hr to equal to or less than 15 hrs.

5. The process of claim 1, wherein the catalyst in step (c) is a MFI zeolite.

6. The process of claim 5, wherein the catalyst is a ZSM-5 zeolite.

7. The process of claim 6, wherein the catalyst is a Ga/ZSM-5 zeolite.

8. The process of claim 1, wherein the catalyst is a mesoporous MFI zeolite.

9. The process of claim 8, wherein the catalyst is a mesoporous ZSM-5 zeolite.

10. The process of claim 8, wherein the catalyst is a mesoporous Ga/ZSM-5 zeolite.

* * * * *